March 10, 1970     G. J. SHOTTON     3,500,371
ACTIVATION INDICATOR FOR ALKALINE BATTERIES
Filed Jan. 16, 1967
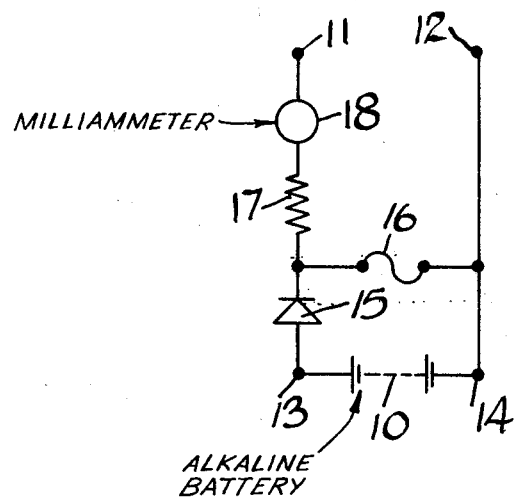

United States Patent Office 3,500,371
Patented Mar. 10, 1970

3,500,371
ACTIVATION INDICATOR FOR ALKALINE BATTERIES
Gordon John Shotton, Sheldon, England, assignor to Joseph Lucas (Industries) Limited, Birmingham, England, a British company
Filed Jan. 16, 1967, Ser. No. 609,652
Claims priority, application Great Britain, Jan. 21, 1966, 2,817/66
Int. Cl. G08b 21/00
U.S. Cl. 340—249
1 Claim

ABSTRACT OF THE DISCLOSURE

An indicator for showing when an alkaline battery is activated by pouring electrolyte into it. Current from a source separate from the battery flows through the warning device in series with a fusible link, but the current is limited to a value such that the link is not broken. When the battery is activated, an additional current flows through the link and breaks it, so that the current to the warning device is broken.

This invention relates to alkaline batteries of the kind in which the electrolyte is stored in a container separate from the cells of the battery and is supplied to the cells of the battery when it is desired to activate the battery.

The object of the invention is to provide in a convenient form an indicator for indicating when the battery is activated, so that some warning will be given in the event that the battery becomes activated.

An indicator according to the invention comprises in combination first and second terminals for connection to a D.C. supply separate from the battery, third and fourth terminals for connection to the battery, or to selected cells of the battery, a diode and a fusible link connected in series across the third and fourth terminals, and an indicating device and a resistor connected in series with the fusible link across the first and second terminals, the arrangement being such that in use before the battery is activated current flows from the first and second terminals through the fusible link without fusing the link, but when the battery is activated, the current from the battery flowing through the fusible link breaks the fusible link.

The accompanying drawing is a circuit diagram illustrating one example of the invention.

Referring to the drawing, there are provided first and second terminals 11, 12 which in use are connected to a 28 volt D.C. supply, and third and fourth terminals 13, 14 which in use are connected to an alkaline battery 10 which has its electrolyte in a separate container, means being provided for supplying the electrolyte to the cells of the battery when it is desired to activate the battery. Instead of connecting the terminals 13, 14 across the entire battery, they could be connected across the cells which are most likely to be activated in the event that the electrolyte leaks into the battery. The terminal 13 is connected to the anode of a diode 15 the cathode of which is connected through a fusible link 16 to the terminal 14, which is connected to the terminal 12. The cathode of the diode 15 is further connected through a resistor 17 and a milliammeter 18 to the terminal 11.

The arrangement is such that when the battery 10 is unactivated, current flows between the terminals 11, 12 through the milliammeter 18, the resistor 17 and the fusible link 16, the resistor 17 limiting the current flow to prevent fusing of the link. The diode 15 prevents the current from passing to the battery.

In the event that the battery 10 becomes activated, either accidentally or as a result of leakage of electrolyte current from the battery 10 flows through the diode 15 and the fusible link 16, and this current is sufficiently high to break the fusible link 16, so that the circuit through the milliammeter 18 is broken, and the milliammeter ceases to indicate a current, so indicating that the battery has become activated.

It will be appreciated that instead of a milliammeter other forms of visual or audible indicating device could be used.

Having thus described my invention what I claim as new and desire to secure by Letters Patent is:

1. An indicator for use in an alkaline battery of the kind in which the electrolyte is stored in a container separate from the coils of the battery and is supplied to the cells of the battery when it is desired to activate the battery, comprising in combination first and second terminals for connection to a D.C. supply separate from the battery, third and fourth terminals for connection to the battery, means connecting second and fourth terminals, a diode and a fusible link connected in series across the third and fourth terminals, and an indicating device and a resistor and said fusible link being connected in series across the first and second terminals, current flowing from the first and second terminals through the fusible link being insufficient to fuse the link, but when the battery is activated, the additional current from the battery flowing through the fusible link is sufficient to break the fusible link.

References Cited

UNITED STATES PATENTS 1,296,558 3/1919 Robinson.

FOREIGN PATENTS 917,839 9/1954 Germany.

JOHN W. CALDWELL, Primary Examiner

DANIEL MYER, Assistant Examiner

U.S. Cl. X.R.
340—250